(12) United States Patent
Moyer et al.

(10) Patent No.: US 7,992,052 B2
(45) Date of Patent: *Aug. 2, 2011

(54) PROGRAM CORRELATION MESSAGE GENERATION FOR DEBUG

(75) Inventors: William C. Moyer, Dripping Springs, TX (US); Richard G. Collins, Austin, TX (US); Jonathan J. Gamoneda, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/389,156

(22) Filed: Feb. 19, 2009

(65) Prior Publication Data

US 2010/0211828 A1    Aug. 19, 2010

(51) Int. Cl.
*G06F 11/00* (2006.01)
(52) U.S. Cl. .......................................... 714/45; 714/47.1
(58) Field of Classification Search .................... 714/45, 714/38, 47, 48, 38.1, 38.11, 47.1; 712/205, 712/208; 717/124, 126, 128; 711/207
See application file for complete search history.

(56) References Cited

U.S. PATENT DOCUMENTS

| 5,127,103 | A | * | 6/1992 | Hill et al. .......................... 714/45 |
| 5,630,049 | A | * | 5/1997 | Cardoza et al. ................ 714/25 |
| 5,913,923 | A | * | 6/1999 | Dunlap et al. ................ 710/100 |
| 6,779,145 | B1 | | 8/2004 | Edwards et al. |
| 6,883,162 | B2 | * | 4/2005 | Jackson et al. ................ 717/124 |
| 6,918,065 | B1 | * | 7/2005 | Edwards et al. ................ 714/45 |
| 7,296,137 | B2 | | 11/2007 | Moyer |
| 7,299,335 | B2 | | 11/2007 | Moyer |
| 2006/0117224 | A1 | | 6/2006 | Wu |
| 2006/0271919 | A1 | | 11/2006 | Moyer |
| 2007/0130119 | A1 | * | 6/2007 | Phillips .............................. 707/3 |

OTHER PUBLICATIONS

Ruiz, Juan-Carlos; "On-chip Debugging-based Fault Emulation for Robustness Evaluation of Embedded Software Components"; 2005; IEEE.
PCT Application No. PCT/US2010/021780; Search Report and Written Opinion dated Aug. 13, 2010.
U.S. Appl. No. 12/179,632, filed Jul. 25, 2008.
U.S. Appl. No. 12/179,629, filed Jul. 25, 2008.
U.S. Appl. No. 12/179,631, filed Jul. 25, 2008.

* cited by examiner

*Primary Examiner* — Dieu-Minh Le
(74) *Attorney, Agent, or Firm* — Joanna G. Chiu; Robert L. King

(57) ABSTRACT

A data processing system and method includes a data processor and memory that are coupled to debug circuitry that generates debug messages including address translation trace messages. A memory management unit (MMU) includes a translation lookaside buffer (TLB) for implementing address translation to translate addresses between virtual and physical forms. The debug circuitry includes message generation circuitry coupled to the MMU for receiving notice when TLB entries are modified and generating both an address translation trace message and a corresponding program correlation message containing at least one of branch history information and instruction count information. The branch history information is a history of direct branch instructions that are executed and whether, when executed, the direct branch instructions were taken. The instruction count information is a count of one or more data processing instructions executed up to a point in time when a new TLB entry is established in the TLB.

20 Claims, 8 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|----|----|----|----|----|----|----|----|----|----|----|----|----|----|----|----|----|----|----|----|----|----|
| MA0 | 0 | TLBSEL (01) | | 0 | | | | | ESEL | | | | | | | 0 | | | | | | | | | | | | | | | | |
| MA1 | V A L I D | 0 | | | | | | TID | | | | | | | | 0 | | | | | TSIZE | | | | 0 | | | | | | |
| MA2 | VPN | | | | | | | | | | | | | | | | | | | | | | | 0 | | V L E | L W | I W | M G | E | |
| MA3 | PPN | | | | | | | | | | | | | | | | | | | | | U 0 | U 1 | U 2 | U 3 | U X | S X | U W | S W | U R | S R | |

FIG. 4

TLBWE

| 0 | 5 | 6 | | 20 | 21 | | 30 | 31 |
|---|---|---|---|---|---|---|---|---|
| 31 | | 0 | | | | SUBOPCODE | | 0 | tlb_entry_id = MA0 (TLBSEL, ESEL)
MMU (tlb_entry_id) = MA1, MA2, MA3

FIG. 5
- PRIOR ART -

TLB_INV

| 31 | | 0 | RA | RB | SUBOPCODE | 0 |
|---|---|---|---|---|---|---|

EA ← RA + RB
tlb_invalidation (EA)

FIG. 6
- PRIOR ART -

| VIRTUAL ADDRESS FIELD | SEQUENCE COUNT FIELD | SOURCE PROCESSOR FIELD | TRANSFER CODE FIELD |
|---|---|---|---|
| | | | 000100 |

PROGRAM TRACE INDIRECT BRANCH MESSAGE
(TRADITIONAL MODE)

FIG. 7
- PRIOR ART -

| VIRTUAL ADDRESS FIELD | BRANCH HISTORY | SEQUENCE COUNT FIELD | SOURCE PROCESSOR FIELD | TRANSFER CODE FIELD |
|---|---|---|---|---|
| | | | | 011100 |

PROGRAM TRACE INDIRECT BRANCH MESSAGE
(HISTORY MODE)

FIG. 8
- PRIOR ART -

| DATA VALUE(S) | VIRTUAL ADDRESS FIELD | DATA SIZE FIELD | SOURCE PROCESSOR FIELD | TRANSFER CODE FIELD |
|---|---|---|---|---|
| | | | | 000101 (DATA WRITE) 000110 (DATA READ) |

DATA TRACE MESSAGE

FIG. 9
- PRIOR ART -

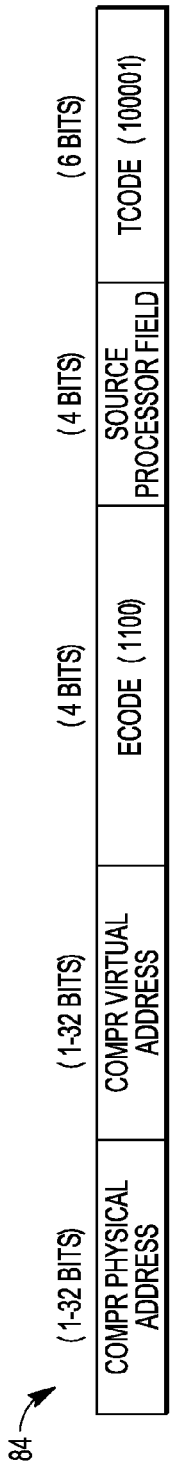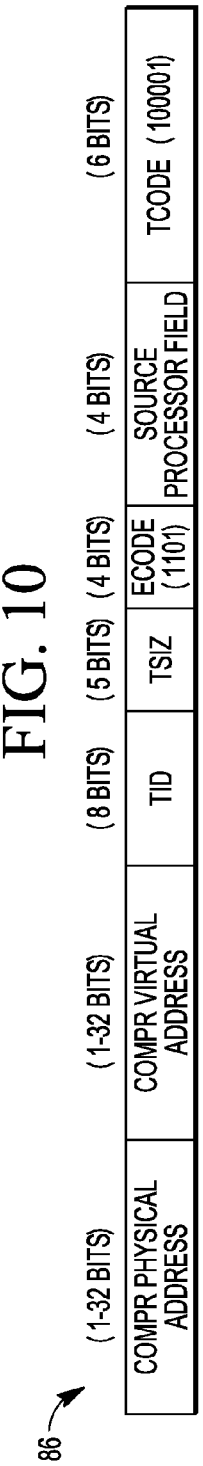
FIG. 10
FIG. 11
FIG. 12
- PRIOR ART -
MESSAGE GENERATION:
A1 = 0000 0000 0000 0000 0011 1111 1100 0000 0000
A2 = 0000 0000 0000 0000 0011 1111 1111 0011 0110 0000
A1 ⊕ A2 = 0000 0000 0000 0000 0000 0000 1111 0110 0000
ADDRESS MESSAGE (M1) = 1111 0110 0000
ADDRESS RE-CREATION:
A1 ⊕ M1 = A2
A1 = 0000 0000 0000 0000 0011 1111 1100 0000 0000
M1 = 0000 0000 0000 0000 0000 0000 1111 0110 0000
A2 = 0000 0000 0000 0000 0011 1111 1111 0011 0110 0000

FIG. 13

| TLB_INV VIRTUAL ADDRESS (UNCOMPRESSED) | ECODE (1110) | SOURCE PROCESSOR FIELD | TCODE (100001) |
|---|---|---|---|

TLB_INV - BASED ADDRESS TRANSLATION TRACE MESSAGE

FIG. 14

| COMPR PHYSICAL ADDRESS | COMPR VIRTUAL ADDRESS | BRANCH HISTORY | SEQUENCE COUNT | ECODE | SOURCE PROCESSOR FIELD | TCODE (100001) |
|---|---|---|---|---|---|---|
| (1-32 BITS) | (1-32 BITS) | (1-32 BITS) | (1-8 BITS) | (4 BITS) | (4 BITS) | (6 BITS) |

ADDRESS TRANSLATION TRACE MESSAGE WITH HISTORY DELIMITATION

FIG. 15

| BRANCH HISTORY | SEQUENCE COUNT | ECODE | SOURCE PROCESSOR FIELD | TCODE (100001) |
|---|---|---|---|---|
| (1-32 BITS) | (1-8 BITS) | (4 BITS) | (4 BITS) | (6 BITS) |

PROGRAM CORRELATION MESSAGE WITH HISTORY DELIMITATION

US 7,992,052 B2

PROGRAM CORRELATION MESSAGE GENERATION FOR DEBUG

RELATED APPLICATIONS

This application is related to U.S. Ser. No. 12/389,153 entitled "Address Translation Trace Message Generation for Debug" filed of even date herewith and assigned to the assignee hereof.

BACKGROUND

1. Field

This disclosure relates generally to semiconductors, and more specifically, to data processing systems that implement address translation and generate address translation trace messages.

2. Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system is highly desirable to remain transparent to operation of the system.

Debug messages are generated by the data processing system that contain address and data information for either program events (program trace messaging), or data events (data read messaging, data write messaging), as well as other debug information. The address information is typically virtual address information which is a format that must be translated to identify a physical memory location known as a physical address. Correlation of the address to a program undergoing execution is an important part of the debugging process so that actual program flow and the dynamic values of system data variables can be monitored. Virtual to physical address mapping or translation must be performed. However, an external debugger typically does not have the necessary virtual to physical mapping information to quickly translate the address portions of the debug messages, particularly when these mappings are dynamically changing due to demand paging or other remapping operations. The use of the virtual addresses allows a debug user a straightforward way to trace a computer program via a program listing obtained by a compile and link function which uses virtual addresses for text and data sections of the software application. The user typically has no knowledge of how the virtual addresses are translated to physical addresses by an operating system (OS). Therefore, tracing is required to indicate virtual addresses. Unfortunately certain program listings are unavailable, such as program listings for pre-compiled software modules which are executed at runtime. Examples of such modules are OS calls and library functions. In such an example, no program listing is available. Thus it is very difficult to properly trace and interpret these sections of the executed program. Correct translation of a virtual address to a physical address requires knowing where a program counter is and examining physical memory to determine where the address is. For systems executing multiple programs the memory mapping varies dynamically and readily transitions between memory pages. In such situations, the address translation significantly precludes debug message generation and interpretation from being performed real-time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates in diagram form exemplary MMU update registers of FIG. 2;

FIG. 5 illustrates in diagram form an exemplary translation lookaside buffer (TLB) write entry instruction in accordance with the prior art;

FIG. 6 illustrates in diagram form an exemplary TLB invalidate address instruction in accordance with the prior art;

FIG. 7 illustrates in diagram form an exemplary program trace message in traditional mode in accordance with the prior art;

FIG. 8 illustrates in diagram form an exemplary program trace message in history mode in accordance with the prior art;

FIG. 9 illustrates in diagram form an exemplary data trace message in accordance with the prior art;

FIG. 10 illustrates in diagram form an exemplary address translation trace message with field compression in accordance with one embodiment of the present invention;

FIG. 11 illustrates in diagram form an exemplary address translation trace message in accordance with one embodiment of the present invention;

FIG. 12 illustrates an example of address compression useable with message generation in accordance with the prior art;

FIG. 13 illustrates in diagram form an exemplary address translation trace message in accordance with one embodiment of the present invention;

FIG. 14 illustrates in diagram form an exemplary address translation trace message with history delimitation in accordance with one embodiment of the present invention; and FIG. 15 illustrates in diagram form an exemplary program correlation trace message with history delimitation in accordance with one embodiment of the present invention.

DETAILED DESCRIPTION

Many data processing systems typically use address translation logic, such as translation lookaside buffers (TLBs) to map virtual addresses to physical addresses. Entries within this address translation logic (such as TLB entries) may be modified or invalidated through the use of processor instructions or by hardware within the data processing system which dynamically maintains address translations by performing address translation table searches and TLB updates as required by software execution, such as by performing hardware "table-walking" or similar types of hardware searches. According to one aspect of the present invention, debug messages, such as address translation trace messages, are generated in response to modification or invalidation of an entry within the address translation logic. These address translation trace messages can then be provided to an external development system for improved debugging capability. Furthermore, in cases in which the virtual address mapping is changed, program correlation messages may also be generated with the appropriate timing so as to provide more accurate information with respect to branch history information and sequence count information. Also, according to another aspect of the present invention, efficiency may be further improved by compressing one or more fields of the debug messages, by field-compressing the debug messages, or by merging multiple messages (such as program correlation messages) when possible.

Figure 1:
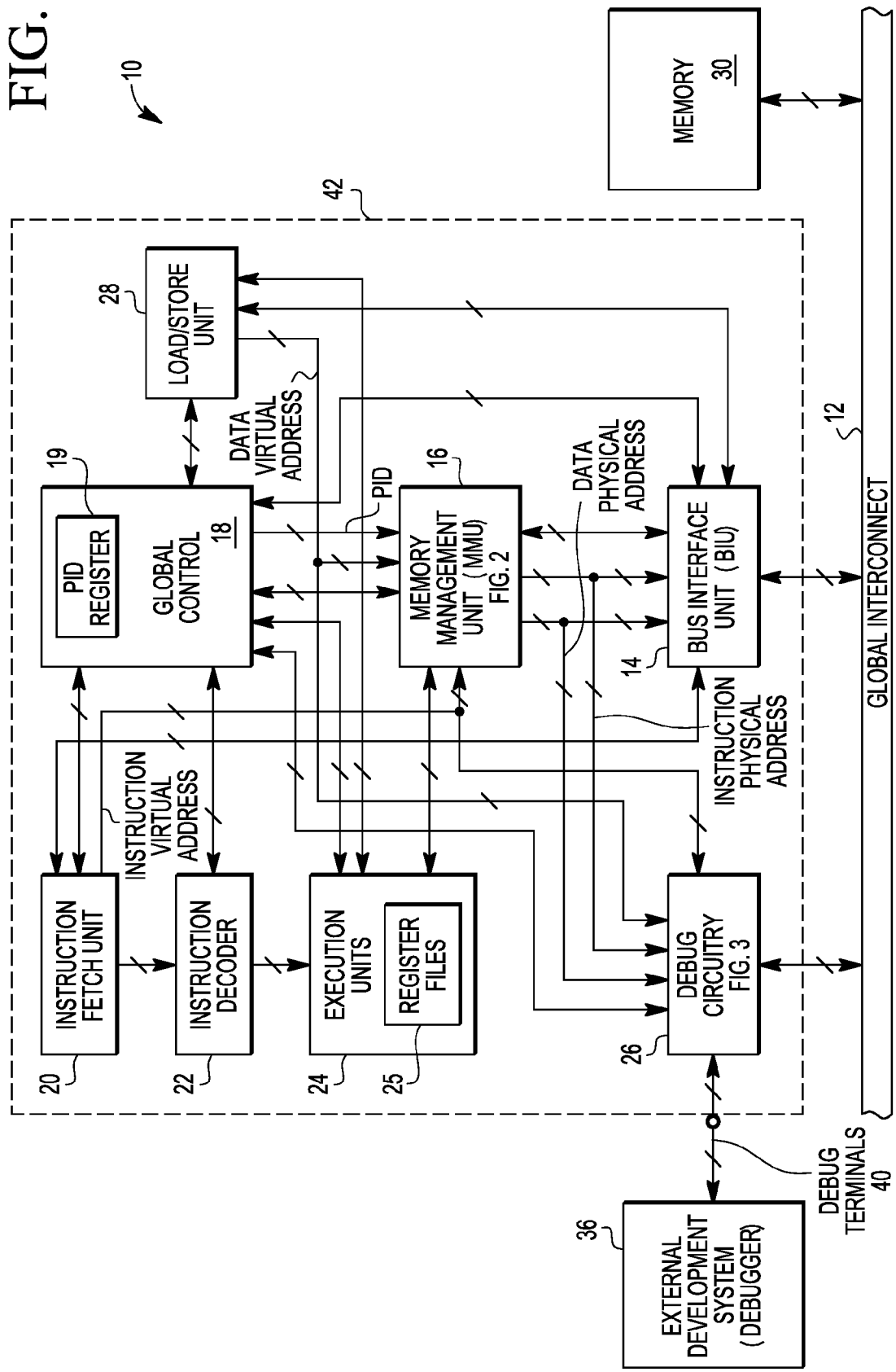
FIG. 1 illustrates in block diagram form a data processing system having debug message generation in accordance with one form of the present invention.

Illustrated in FIG. 1 is a data processing system 10 that generates debug messages. Within data processing system 10 is a global interconnect 12. In one form global interconnect 12 is a system bus. Other forms of interconnect may be used including, for example, crossbars, point-to-point connections, and optical and wireless transmission techniques. A bus interface unit (BIU) 14 is coupled to global interconnect 12 via a bidirectional coupling. In one form the bidirectional coupling is a bidirectional multiple conductor bus wherein multiple conductor buses herein are represented with a slash across the conductor. BIU 14 is bidirectionally coupled to memory management unit (MMU) 16. MMU 16 is coupled to a first input/output terminal of a global control circuit 18 via a bidirectional multiple conductor bus. A second input/output terminal of global control circuit 18 is coupled to a first input/output terminal of an instruction fetch unit 20 via a bidirectional multiple conductor bus. Instruction fetch unit 20 has an output coupled to an input of an instruction decoder 22 via a multiple conductor bus. An output of instruction decoder 22 is coupled to an input of execution units 24. In one form execution units 24 include at least one arithmetic logic unit, at least one floating point unit and at least one multiplier circuit. Within the execution units 24 are register files 25. An input/output terminal of instruction decoder 22 is coupled to a third input/output terminal of the global control circuit 18. A first input/output terminal of execution units 24 is coupled to a fourth input/output terminal of global control circuit 18. Execution units 24 and instruction fetch unit 20 are also bidirectionally coupled to MMU 16. Debug circuitry 26 has an input/output terminal coupled to a fifth input/output terminal of global control circuit 18. A load/store unit 28 has a first input/output terminal bidirectionally coupled to a sixth input/output terminal of global control circuit 18. Load/store unit 28 has a second input/output terminal coupled to a first input/output terminal of BIU 14. Load/store unit 28 has a third input/output terminal coupled to a second input/output terminal of execution units 24. A second input/output terminal of BIU 14 is coupled to a seventh input/output terminal of global control circuit 18. An output of load/store unit 28 provides a data virtual address and is coupled to a first input of MMU 16 and a first input of debug circuitry 26. An output of instruction fetch unit 20 provides an instruction virtual address and is coupled to a second input of MMU 16 and a second input of debug circuitry 26. A first output of MMU 16 provides a data physical address and is coupled to a first input of BIU 14 and to a third input of debug circuitry 26. A second output of MMU 16 provides an instruction physical address and is coupled to a second input of BIU 14 and to a fourth input of debug circuitry 26.

A memory 30 is coupled to global interconnect 12 via a bidirectional coupling. Debug circuitry 26 has a second input/output terminal coupled to a plurality of debug terminals 40 via bidirectional multiple conductors. The plurality of debug terminals 40 are coupled to an external development system 36 that is commonly referred to as a debugger or external debugger. In the illustrated form BIU 14, MMU 16, global control circuit 18, instruction fetch unit 20, instruction decoder 22, execution units 24 with register files 25, debug circuitry 26 and load/store unit 28 collectively form a data processor 42 as indicated by the dashed line grouping in FIG. 1. While global control circuit 18 is illustrated in FIG. 1 in a segregated location, it should be well understood that the circuitry and functional control of global control circuit 18 may also be implemented in a distributed manner and be included within any of the various other system blocks of data processing system 10. Also, in the illustrated embodiment, global control 18 includes a process identifier (PID) register 19 which stores a process identifier (PID) for the currently executing process. Global control 18 also provides the PID to MMU 16.

In operation, data processing system 10 communicates with devices (not shown) via global interconnect 12. Information communicated with data processor 42 transfers through BIU 14. Instruction fetch unit 20 retrieves data processor instructions (i.e. processor instructions) from BIU 14 under control of global control circuit 18. The retrieved instructions are sequentially communicated to instruction decoder 22 for decoding under control of global control circuit 18. Execution units 24 execute instructions and generate data that is either stored in a cache (not shown) or placed in the memory 30 via coupling through global control circuit 18, BIU 14 and global interconnect 12. Debugging of the operation of data processor 42 and data processing system 10 is performed by the use of debug circuitry 26 that generates debug messages for analysis by external development system 36. A test or debug mode of operation is entered in response to activation of such from external development system 36. In the illustrated form, debug circuitry 26 is configured to receive data addresses and instruction addresses, where the addresses may be virtual addresses or physical addresses. A data address is an address where data resides whereas an instruction address is an address where an instruction resides. Instruction virtual addresses are provided from instruction fetch unit 20 to the debug circuitry 26 and MMU 16. A virtual address is an untranslated address which requires some further processing or translating to obtain the translated address of the physical storage location where the information is residing. This translated address is referred to as the physical address. MMU 16 provides instruction physical addresses to BIU 14 and debug circuitry 26. In one form, the virtual or untranslated addresses may be logical addresses. In another form the untranslated addresses may be effective addresses. Effective addresses must first be translated into virtual addresses before being translated into physical addresses. Load/store unit 28 provides data virtual addresses to debug circuitry 26 and to MMU 16. MMU 16 provides data physical addresses to BIU 14 and debug circuitry 26.

Debug circuitry 26 then forms a debug message for external development system 36 using at least a portion of one or more of the received addresses, as will be discussed in more detail below. The format of debug messages may vary and examples will discussed below in connection with FIGS. 7, 8, 9, 10, 11 13, 14, and 15.

Figure 2:
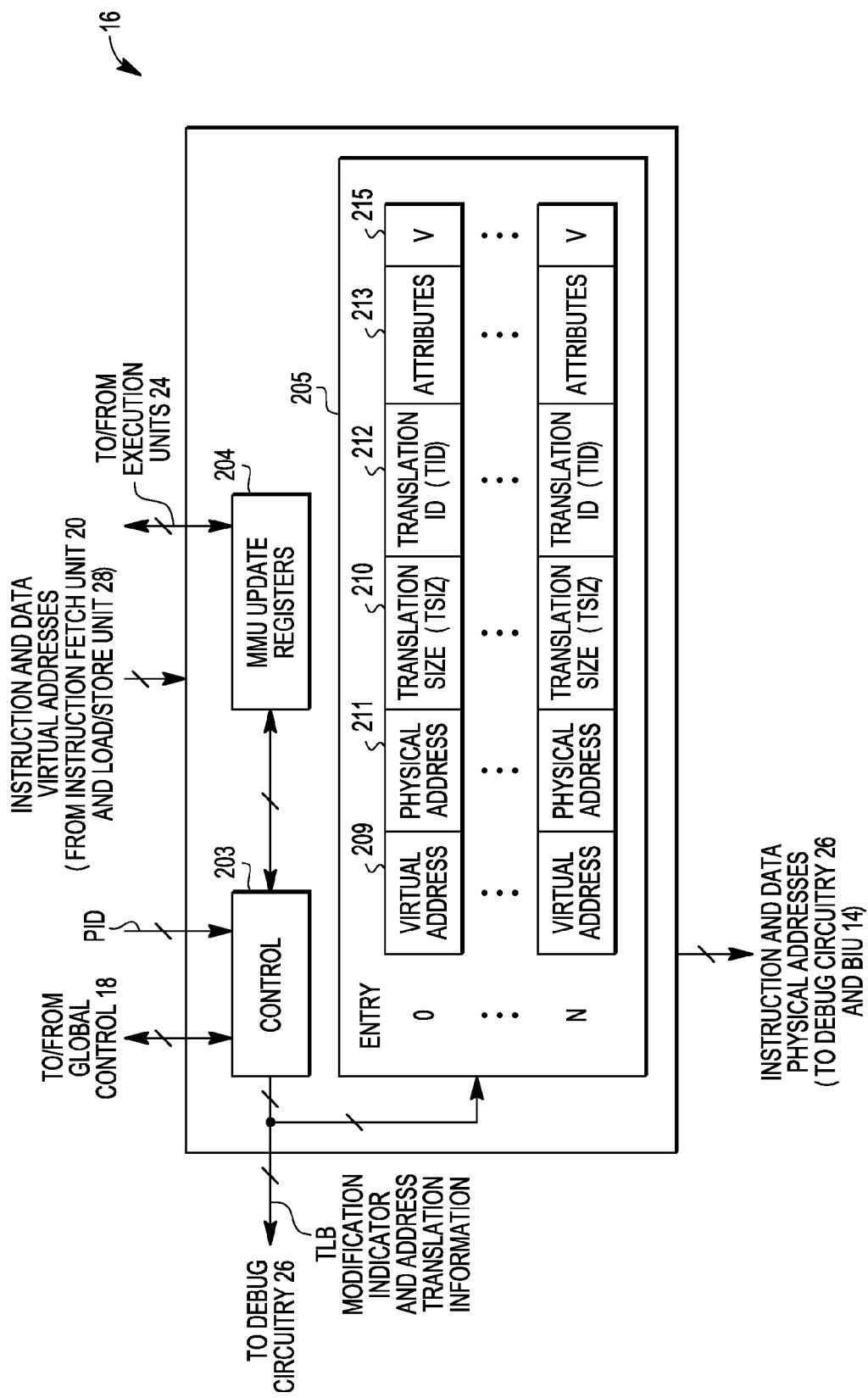
FIG. 2 illustrates in block diagram form one form of address translation logic of FIG. 1.

Illustrated in FIG. 2 is an exemplary embodiment of a portion of MMU 16 of FIG. 1. MMU 16 includes control circuitry 203, MMU update registers 204, and address translation logic 205. In one form, address translation logic 205 is implemented as a translation lookaside buffer (TLB) having N+1 entries, numbered 0 through N, where each entry includes a virtual address 209, a corresponding physical address 211, a corresponding translation size (TSIZ) 210, a corresponding translation ID (TID) 212, corresponding attributes 213, and a corresponding valid field 215. In alternate embodiments, address translation logic 205 may be implemented differently. Control 203 is bidirectionally coupled to MMU update registers 204 and provides a modification indicator and address translation information to debug circuitry 26 and address translation logic 205. Control 203 is also bidirectionally coupled to global control 18 and receives PID from global control 18. MMU update registers 204 may include one or more registers and is bidirectionally coupled with execution units 24.

In operation, entries 0 through N store address mapping information used to translate virtual addresses to physical addresses. For example, an instruction or data virtual address is provided to MMU 16 (such as from instruction fetch unit 20 or load/store unit 28) where it is compared against the virtual addresses 209 stored in address translation logic 205. If a matching entry is found (where a matching entry is also a valid entry, as indicated by valid field 215), then the corresponding physical address 211 is provided as the instruction or data physical address to debug circuitry 26 and BIU 14. The corresponding TSIZ 210 of the matching entry provides the page size corresponding to the translated address and the corresponding TID 212 of the matching entry provides an address space identifier. When the TID field is 0, the matching entry applies to all processes because this entry is global. However, when the TID 212 is non-zero, a matching entry is only determined when both the received virtual address and the received PID match the virtual address 209 and the TID 212, respectively, of a valid entry in address translation logic 205. Also, through the use of MMU update registers 204, control 203, in response to processor instructions executed by processor 42, can update or modify entries within address translation logic 205, as will be discussed in more detail below in reference to FIG. 4. When control 203 modifies or updates an entry within address translation logic 205, a modification indicator is provided to address translation logic 205 as well as to debug circuitry 26.

Figure 3:
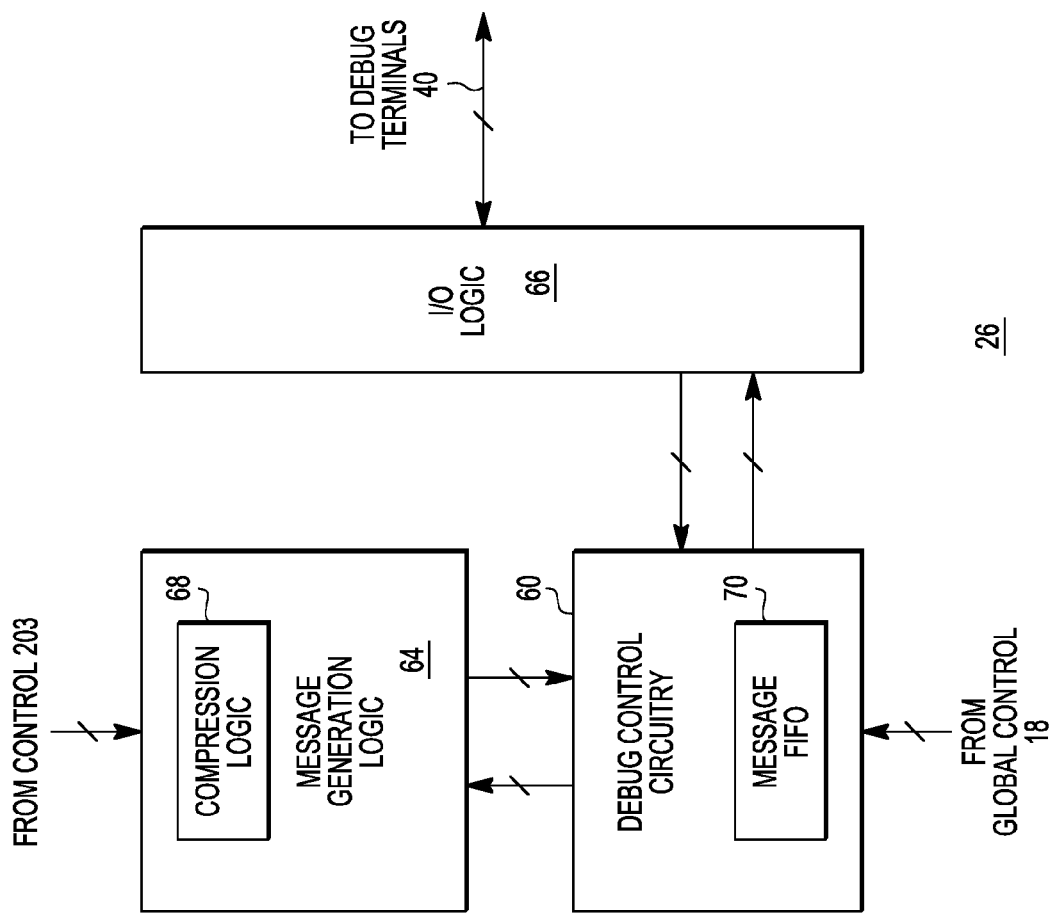
FIG. 3 illustrates in block diagram form one form of debug circuitry of FIG. 1.

Illustrated in FIG. 3 in an exemplary embodiment of a portion of the debug circuitry 26 of FIG. 1. Debug circuitry 26 includes debug control circuitry 60, message generation logic 64, and input/output (I/O) logic 66. Message generation logic 64 includes compression logic 68 and is coupled to receive the modification indicator and address translation information from control 203 within MMU 16. Debug control circuitry 60 includes a message first-in first-out storage circuit (FIFO) 70 and is bidirectionally coupled to message generation logic 64 and I/O logic 66. Debug control circuitry 60 also receives information from global control circuit 18. I/O logic 66 is bidirectionally coupled to debug terminals 40.

In operation, message generation logic 64 is the logic circuitry which implements the function of forming debug messages pursuant to a selected one of a plurality of predetermined formats. Message generation logic 64 forms the debug messages, where compression logic 68 may perform message compression on parts or all of the messages, and these debug messages are then provided to debug control circuitry 60 where they are stored in message FIFO 70. From message FIFO 70, the debug messages are routed to debug terminals 40 via I/O logic 66. In one embodiment, each time an entry in address translation logic 205 is modified or updated, message generation logic 64 generates an address translation trace message. For example, each time control 203 asserts the modification indicator which indicates to both address translation logic 205 and message generation logic 64 that an entry in address translation logic 205 is being modified, message generation logic 64 generates an address translation trace message based on address translation information received from control 203. Note that modification of an entry, as used herein, may also include invalidation of an entry. The format of these address translation trace messages will be described in more detail below in reference to FIGS. 10, 11, 13 and 14.

Illustrated in FIG. 4 is one example of MMU update registers 204. In the illustrated embodiment, MMU update registers 204 includes 4 registers: MA0, MA1, MA2, and MA3. These registers are used to update entries in address translation logic 205. In the illustrated embodiment, each of these registers is a 32-bit register which include a plurality of fields. MA1 includes a 2-bit TLBSEL field and a 6-bit ESEL field. The TLBSEL field stores a value which indicates which TLB is to be updated. In the illustrated embodiment, only one TLB is illustrated (address translation logic 205) in which the TLBSEL field may not be present; however, in alternate embodiments, any number of TLBs may be implemented. The ESEL field stores a value which indicates an entry number of the TLB (e.g., one of entry 0 through N in address translation logic 205). MA1 includes an 8-bit TID field and a 5-bit TSIZE field. The TID field stores a value which indicates a translation identifier field and the TSIZE field stores a value which indicates a page size. MA2 includes a 22-bit field VPN field which stores a value which indicates the virtual page number. MA2 also includes various fields which store attributes such as VLE (page is using Variable Length Encoding for instructions), W (page is Writethrough), I (page is cache Inhibited), M (page is "memory coherence required"), G (page is Guarded), and E (page Endianness). MA3 includes a 22-bit field PPN field which stores a value which indicates the physical page number and stores a plurality of attributes (e.g. U0-U3 (user defined attributes), UX, SX, UW, SW, UR, and SR (User and Supervisor Read, Write and eXecute permissions)). Note that in alternate embodiments, MMU update registers 204 may include more registers than those illustrated and the information stored therein may be organized in a variety of different formats using any number of registers. Also, each field may have more or fewer bits, as needed to store the appropriate of information. Note that the TID may be considered an extension to the virtual address such that the virtual address can be calculated as "VPN concatenated with TID". Therefore, these registers may be updated by global control 18 in response to one or more processor instructions (such as move to special purpose register instructions) by processor 42. The information stored in these registers is then used to update an entry in address translation logic 205 in response to a processor instruction executed by processor 42. In alternate embodiments of the present invention, updates to address translation logic 205 (such as a TLB) may be performed by control logic responsive to a TLB miss. This control logic may be implemented as part of control logic 203 or may be implemented elsewhere within MMU 16 or processor 42. In one embodiment, this control logic that is responsive to a TLB miss automatically obtains address translation entry information by searching one or more translation tables stored in memory 30, or elsewhere within data processing system 10, and subsequently performs address translation modifications within address translation logic 205 based on information retrieved from the address translation tables, without the use of a processor instruction explicitly executed by processor 42.

For example, FIG. 5 illustrates an example of a currently existing processor instruction, a TLB Write Entry (TLBWE) instruction, which may be used to update a TLB entry (i.e. an entry within address translation logic 205). The TLBWE instruction causes the contents of certain fields within MMU update registers 204 to be written into a single entry in address translation logic 205. The entry that is written (tlb_entry_id) is specified, for example, by the TLBSEL and ESEL fields of MA0. Upon executing a TLBWE instruction, this identified entry is updated with the appropriate information in MA1, MA2, and MA3. That is, the values in the TID field and TSIZE fields of MA1 are stored into the TSIZ field 210 and TID field 212 of the identified entry of address translation logic 205. Similarly, the value of VPN in MA2, and the value of PPN and the attributes of MA3 are stored into the corresponding fields virtual address 209, physical address 211, and attributes 213 of the identified entry. Also, the valid bit 215 of the identified entry is set to indicate a valid entry.

FIG. 6 illustrates another example of a currently existing processor instruction, a TLB Invalidate Entry (TLB_INV) instruction, which may be used to invalidate an entry of address translation logic 205. The TLB_INV instruction format species two source registers, RA and RB, which are used, upon execution of a TLB_INV instruction, to calculate an effective address (EA) of RA+RB. That is EA equals the contents of RA plus the contents of RB. This EA address is then used to find a matching entry within address translation logic 205, and upon finding a matching entry, the valid bit 215 of that matching entry is set to indicate an invalid entry. Source registers RA and RB can be any two general purpose registers located within, for example, register files 25 of processor 42.

In one embodiment of the present invention, when an entry of address translation logic 205 is updated, such as whenever either a TLBWE or a TLB_INV instruction is executed, control 203 notifies debug circuitry 26 via the modification indicator and, in response thereto, message generation logic 64 in debug circuitry 26 generates an address translation trace message which may be provided (from FIFO 70, via I/O logic 66) to debug terminals 40. In this manner, debugger 26 need not explicitly request address translation information from address translation logic 205 since the information is automatically sent when a modification occurs. An example of TLBWE-based address translation trace messages and a TLB_INV-based address translation trace message will be described in reference to FIGS. 10, 11, and 13. Also, when a TLBWE or a TLB_INV instruction is executed, control 203, using information stored in MMU update registers 204 as described above, provides the appropriate control and information to address translation logic 205 to appropriately update the identified or matching entry. Therefore, note that, in addition to a modification indicator, control 203 may provide other information, as needed, along with the modification indicator to address translation logic 205 and to debug circuitry 26. In alternate embodiments, other update mechanisms may be used to cause entries within address translation logic 205 to be modified, and in response, control 203 can provide the appropriate signaling to debug circuitry 26 to indicate the modification and the information associated with the modification needed to allow debug circuitry 26 to properly generate address translation trace messages.

Illustrated in FIGS. 7, 8, and 9 are trace messages which are generated by currently available debug logic. Illustrated in FIG. 7 is a program trace indirect branch message 80 in traditional mode. Illustrated in FIG. 8 is a program trace indirect branch message 81 in history mode. Program trace indirect branch messages are generated when instructions executing on processor 42 perform an indirect branch. An indirect branch is a branch whose target address is not directly provided in the branch instruction, but instead is stored in another location, such as a register, or needs to otherwise be dynamically calculated or determined (such as for subroutine calls). A direct branch is a branch whose target is directly provided with the instruction, such as with a label corresponding to a particular address location or provided by an offset value in the instruction, and thus is typically a static value that can be determined by the debugger based on knowledge of the program instruction values. Illustrated in FIG. 9 is a data trace message 82.

Referring to FIG. 7, trace message 80 has four illustrated fields. A virtual address field contains the virtual address of trace message 80. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies trace message 80 as a program trace indirect branch message having a particular predetermined field format. In the example of FIG. 7, the value that represents a program trace message with the illustrated form is "000100," indicating the program trace indirect branch message was generated using traditional branch trace mode operation.

Referring to FIG. 8, trace message 81 has five illustrated fields. A virtual address field contains the virtual address of trace message 81. A branch history field contains a plurality of 1-bit values, where, for each direct branch taken since the last program trace message, a corresponding 1-bit value is set or cleared to indicate whether the direct branch was taken or not taken. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies trace message 80 as a program trace indirect branch message having a particular predetermined field format. In the example of FIG. 8, the value that represents a program trace message with the illustrated form is "011100, " indicating the program trace indirect branch message was generated using history mode branch trace operation.

Referring to FIG. 9, trace message 82 has five illustrated fields. A data value(s) field contains one or more data values associated with trace message 82. A virtual address field contains the virtual address of the trace message 82. A data size field contains a value that represents the length of the data or the number of bits contained in a data word. A source processor field contains a value that identifies what processor that the trace message 82 is associated with. This field information is valuable in multiple processor systems. A transfer code field contains a value that identifies the trace message 80 as a data trace message having a particular predetermined field format. In the example of FIG. 9, the value that represents a data write trace message with the illustrated form is "000101". The value that represents a data read trace message with the illustrated form is "000110".

FIGS. 10 and 11 illustrate address translation trace messages 84 and 86, respectively, in accordance with embodiments of the present invention. In response to execution of a TLBWE instruction, as described above, a debug message such as address translation trace message 84 or address translation trace message 86 may be generated by debugger 26. Therefore, note these address translation trace messages may be referred to as TLBWE-based address translation trace messages. Note that address translation trace message 84 is a field compressed version of a TLBWE-based address translation trace message and address translation trace message 86 is a non-field compressed version.

Referring first to FIG. 11, trace message 86 has eight illustrated fields. The positioning of the fields is arbitrary. A compressed physical address field contains the physical address, in compressed form, of trace message 86. That is, this field represents a compressed version of the physical page number address of the modified entry of the TLB (of address translation logic 205) which triggered the generation of the trace message. A compressed virtual address field contains the virtual address, in compressed form, of trace message 86. That is, this field represents a compressed version of the virtual page number address of the modified entry. A TID field contains a value which represents the TID value of the modified entry. A TSIZ field contains a value which represents the TSIZ value of the modified entry. A source processor field contains a value that identifies what processor that the trace message 86 is associated with. This field information is valuable in multiple processor systems. A transfer code (TCODE) field contains a value that identifies trace message 84 as an address translation trace message having a particular predetermined field format. In the example of FIG. 10, the value that represents an address translation trace message is "100001". An event code (ECODE) field contains a value that further identifies the predetermined field format. That is, it may be used to further distinguish between different types of address translation trace messages. In the example of FIG. 11, the value that represents a non-field compressed TLBWE-based address translation trace message with the illustrated form is "1101". Note that, in the example of FIG. 11, each of the physical address and the virtual address fields contains compressed values. One method of compression will be described below in reference to FIG. 12. However, note that in alternate embodiments, only one of these fields may be compressed, or neither of these fields may be compressed. Also, any number of bits, as needed, may be used for each field and a message may include more or less information than illustrated.

Referring back to FIG. 10, FIG. 10 is a field-compressed version (having five illustrated fields) of address translation trace message 86 of FIG. 11. That is, note that for address translation trace message 84, the TID and TSIZ fields are not included as part of the debug message and thus are not transmitted via debug terminals 40. Furthermore, in the example of FIG. 10, the value of the ECODE field is different from that of FIG. 11 because the value of "1100" in FIG. 10 represents a field compressed TLBWE-based address translation trace message with the illustrated form. Note that the description for the remainder of the fields in address translation trace message 84 is the same as those provided above for address translation trace message 86. Therefore, note that in the field compressed mode, the address translation message is compressed by not including selected fields. (In one embodiment, this field compression may be performed by compression logic 68.)

In one embodiment, for field-compressed address translation trace messages, those fields which contain a predetermined prevalent value are the fields that are not included in the message. For example, in one embodiment, both the TID and TSIZE fields tend to have a prevalent value and thus need not be transmitted in each address translation trace message. For example, in one embodiment, a TID value of 00000000 indicates that the address translation entry is to be available to all process ID values, rather than restricted to matching a single process ID (PID) value. In this embodiment, an all-zero TID value may be considered a prevalent TID value. In alternate embodiments, a different TID value representing a predominant process with a predetermined non-zero TID value may be defined to be a prevalent value. In one embodiment, a particular page size for virtual and physical pages may be prevalent. For example, in many systems, a page size of 4 kilobytes (4 Kbytes) is a predominant page size value and may thus be defined as a predetermined prevalent value, since a majority of address translation entries will have such a value encoded in the TSIZ field of the stored TLB entry. For these common cases, field compression allows for a reduction in the maximum message length that must be transmitted to the external development system 36. Such a reduction may improve bandwidth of debug messages, and may also be of benefit in optimizing the size of message FIFO 70 of debug control circuitry 60. In one embodiment, the predetermined prevalent value of a field that is to be removed from the message or not transmitted to external development system 36 is controlled by a user of system 10. That is, this value can be stored in user programmable storage location, such as, for example, within MMU update registers 204.

FIG. 12 illustrates one method for compressing a particular field of a debug message, such as the physical and virtual address fields of a message to obtain, for example, the compressed physical and compressed virtual addresses of FIGS. 10 and 11. (In one embodiment, this compression may be performed by compression logic 68.) Two addresses labeled A1 and A2 are provided. Address A2 is a current address to be used in generating a debug message, such as a physical or virtual address that is to be included in an address translation trace message. Address A1 is a previous address that was used in generated a previous debug message, such as a previous physical or virtual address, respectively, that was included in a previous address translation trace message. The actual values of addresses A1 and A2 are exemplary only and it should be understood that any address value may be used. A modified address is created by performing a logic operation on addresses A1 and A2. The logic operation, in one embodiment, is an exclusive OR operation in which corresponding respective bit positions of address A1 and address A2 are exclusive ORed. The resulting modified address is illustrated in FIG. 12 in which twenty leading zeros are generated. The portion of the address from least significant bit to the most significant binary one bit is grouped as illustrated in FIG. 12 and this grouping forms a modified address M1 which is used as the address (e.g. the compressed physical or compressed virtual address) in the debug message resulting in a smaller average message size for many messages. Redundant information which can be recreated from a previously sent message address is removed. Conversely, the address A2 may be re-created from the debug message address by a debugger as follows. Previous address A1 is exclusive-ORed with the address message M1. The address message M1 is expanded back to a thirty-two bit format by adding the required leading edge zeros in front of the address message M1. The exclusive OR operation results in the address A2. Thus FIG. 12 illustrates how translating from an address to a debug message address and vice versa is implemented. Note that the modified address M1 sent in the first trace message when debugging is first enabled contains a full address with leading zeros removed. The debugger can assume a previous address value of all zeros as an initial address for the basis of expanding the modified address M1 to a full address for the message.

FIG. 13 illustrates an address translation trace messages 88, in accordance with one embodiment of the present invention. In response to execution of a TLB_INV instruction, as described above, a debug message such as address translation trace message 88 may be generated by debugger 26. Therefore, note that address translation trace message 88 may be referred to as a TLB_INV-based address translation trace message. Trace message 88 has four illustrated fields. The positioning of the fields is arbitrary. A TLB_INV virtual address field contains the uncompressed virtual address of trace message 88. That is, this field contains the calculated value of the effective address (calculated using the values in RA and RB) which was used to find a matching entry in address translation logic 205 in order to invalidate it, as was described above. (Alternatively, note that the TLB_INV virtual address may also be compressed.) A source processor field contains a value that identifies what processor that the trace message 88 is associated with. This field information is valuable in multiple processor systems. A transfer code (TCODE) field contains a value that identifies trace message 88 as an address translation trace message having a particular predetermined field format. In the example of FIG. 13, the value that represents an address translation trace message is "100001". An event code (ECODE) field contains a value that further identifies the predetermined field format. That is, it may be used to further distinguish between different types of address translation trace messages. In the example of FIG. 13, the value that represents a TLB_INV-based address translation trace message with the illustrated form is "1110". Note that any number of bits, as needed, may be used for each field and a message may include more or less information than illustrated.

As discussed above in reference to FIG. 8, the branch history field is useful in order to provide a better view of the address translations used for specific taken branches (e.g. for direct branches) which do not generate program trace messages. However, when a change in virtual memory mapping occurs between those executed branches (e.g. indirect branches) which do generate program trace messages, the branch history field no longer provides accurate information beyond the point at which the change in mapping occurred. Therefore, in one embodiment, a program correlation message may be generated which includes the branch history information up to the point of the change in virtual address mapping. That is, a program correlation message can be generated when an address translation trace message is generated in response to a modification of an entry in address translation logic 205. For example, a program correlation message can be generated when a TLBWE-based address translation message is generated. Furthermore, this program correlation message can also be properly ordered with respect to that TLBWE-based address translation message, to allow a debugger, such as external development system 36, to perform program trace reconstruction in the context of the mappings in place at the time the branch history was accumulated. In this manner, the program correlation message can properly provide the branch history information and instruction count information (i.e. sequence count information) for instructions executed since the last program trace message was generated up to the point that an entry in address translation logic 205 was modified by the TLBWE instruction. In one embodiment, the program correlation message corresponding to an address translation trace message is provided before the address translation message.

FIG. 15 illustrates a program correlation message 92 with branch history delimitation which may be generated and properly ordered with respect to an address translation trace message generated in response to modification of an entry in address translation logic 205. Program correlation message 92 has five illustrated fields. The positioning of the fields is arbitrary. A branch history field contains a plurality of 1-bit values, where, for each direct branch taken since the last program trace message, a corresponding 1-bit value is set or cleared to indicate whether the direct branch was taken or not taken. This branch history field contains this information for each direct branch taken up to the point at which an entry in address translation logic 205 is modified and an address translation trace message, such as TLBWE-based address translation trace message 84 or 86, is generated. A sequence count field (also referred to as an instruction count field) contains a value that represents a number of instructions that has been executed since the last program trace message up to the point at which the entry in address translation logic 205 is modified. A source processor field contains a value that identifies what processor that the program correlation message 92 is associated with. This field information is valuable in multiple processor systems. A transfer code field contains a value that identifies program correlation message 92 as a program correlation message with history delimitation of a predetermined field format. In the example of FIG. 15, the value that represents a program trace message with the illustrated form is "100001". An event code (ECODE) field contains a value that further identifies the predetermined field format of program correlation message 92. That is, it may be used to further distinguish between different types of program correlation trace messages. For example, it may be used to represent whether the program correlation message is a merged message or not. (A merged message will be described in further detail below.) In the example of FIG. 15, the value of the ECODE field represents that the program correlation message is not merged, meaning it was caused by only one trigger source (e.g. the modification of an entry in address translation logic 205). Note that any number of bits, as needed, may be used for each field and a message may include more or less information than illustrated. (Note that, in an alternate embodiment, only one of the branch history field or the instruction count field may be included in the program correlation message.)

FIG. 14 illustrates an address translation trace message 90 with history delimitation. That is, in the example of FIG. 14, in response to an entry of address translation logic 205 being modified, rather than generating both an address translation trace message (such as a TLBWE-based address translation trace message) and a program correlation message, a single address translation trace message may be generated which further includes branch history information and an instruction count. That is, the information of a TLBWE-based address translation trace message (such as trace messages 84 or 86) may further include branch history information or instruction count information or both up to the point that the modification of the entry of address translation logic 205. In one embodiment, an address translation trace message 90 includes the fields of a field-compressed TLBWE-based address translation trace message, such as translation message 84, so as to reduce the message size. This size reduction may be needed, for example, so that the generate message can properly fit within message FIFIO 70. That is, the TSIZ and TID fields may not be included in this type of address translation trace message with history delimitation.

In the illustrated embodiment of FIG. 14, trace message 90 has seven illustrated fields. The positioning of the fields is arbitrary. A compressed physical address field contains the physical address, in compressed form, of trace message 90. That is, this field represents a compressed version of the physical address of the modified entry of the TLB (of address translation logic 205) which triggered the generation of the trace message. A compressed virtual address field contains the virtual address, in compressed form, of trace message 09. That is, this field represents a compressed version of the virtual address of the modified entry. A branch history field contains a plurality of 1-bit values, where, for each direct branch taken since the last program trace message, a corresponding 1-bit value is set or cleared to indicate whether the direct branch was taken or not taken. This branch history field contains this information for each direct branch taken up to the point at which an entry in address translation logic 205 is modified, thus triggering generation of trace message 90. A sequence count field contains a value that represents a number of instructions that has been executed since the last program trace message up to the point at which the entry in address translation logic 205 is modified. A source processor field contains a value that identifies what processor that the trace message 90 is associated with. This field information is valuable in multiple processor systems. A transfer code (TCODE) field contains a value that identifies trace message 90 as an address translation trace message having a particular predetermined field format. In the example of FIG. 14, the value that represents an address translation trace message is "100001". An event code (ECODE) field contains a value that further identifies the predetermined field format. That is, it may be used to further distinguish between different types of address translation trace messages. In the example of FIG. 14, the value of the ECODE field represents an address translation trace message with history delimitation of the illustrated format. Note that, any number of bits, as needed, may be used for each field and a message may include more or less information than illustrated. Therefore, note that with generation of a trace message with history delimitation, such as trace message 90, a separate program correlation message (such as program correlation message 92) need not be generated.

In one embodiment, the determination of whether to provide a program correlation message with history delimitation 92 and an address translation trace message at the point that a change of mapping occurs in address translation logic 205 or whether to provide a single address translation trace message with history delimitation 90 may be based on whether field compression can occur to limit the maximum size of a message. If prevalent values are present in the address translation modification, then in one embodiment, a single address translation trace message with history delimitation 90 is generated. If prevalent values are not present, which requires that the TSIZ and/or TID information be provided to external development system 36, the determination may be made to send both a program correlation message with history delimitation (such as message 92) and an address translation trace message (such as message 86). In one embodiment, a single address translation trace message with history delimitation which was not field compressed would exceed the size of the entries in message FIFO 70, and thus would require a larger than optimal FIFO. By selectively generating program correlation message with history delimitation message 92 based on whether message compression is inadequate to allow a single address translation trace message with history delimitation to fit in a predetermined message bit-length, optimization of the width of the entries in message FIFO 70 may be performed, since in some embodiments, the majority of messages require fewer bits than address translation trace messages 86 and 90, and much of the storage capacity of FIFO 70 is unused within a given entry. A better optimization may be to increase the number of entries in FIFO 70 while narrowing the width of the entries. Note that in some embodiments, the determination of whether one or more fields may be eliminated from an address translation trace message due to containing a predetermined prevalent value may be used to select between a single address translation trace message with history delimitation, or both a program correlation message with history delimitation and an address translation trace message without history delimitation. In other embodiments, additional factors, such as the degree of compression of one or both of compressed virtual address and compressed physical address fields may be used in determining the optimal messaging decision strategy.

In one embodiment, additional triggering events (in addition to a change in virtual memory mapping as is caused by modification of an entry of address translation logic 205) may result in the need for a program correlation message (PCM) which provides branch history and a sequence count (i.e. instruction count) up to the point of the triggering event. In one embodiment, processor 42 may be capable of transparently executing multiple instruction sets with unique binary encodings, such as a normal fixed length instruction set, and an alternate variable length encoded (VLE) instruction set. In one embodiment, the instruction set being executed is constant within an instruction page, but may differ in different pages of memory, and thus the interpretation of the stored binary values in the physical memory by the external debugger depends on an accurate knowledge of which instruction set is present in a given page. For example, when processor 42 crosses a page boundary that results in an execution mode switch into or out of a sequence of VLE instructions, a PCM is generated which effectively breaks up any running instruction count and history information between the two modes of operation, thus needing a program correlation message to provide the branch history and sequence count up to the point at which the execution mode switch occurs. Also, in another example, when using program traces in history mode (such as when generating trace messages like trace message 81), when a direct branch results in an execution mode switch into or out of VLE instructions, a PCM is also generated. In addition to these PCM type triggers, another example occurs when program trace messaging becomes masked due to reaching a predetermined instruction mask, or when certain predetermined processor 42 exceptions or other system events within data processing system 10 occur. In these cases, rather than generating a program correlation message due to each of these events which may occur (such as when a change in virtual mapping occurs at the same time as crossing a page boundary resulting in an execution mode switch), a single program correlation message representing both triggering events can be generated. In this example, a format such as that of program correlation message 92 of FIG. 15 can be generated, in which the value of the ECODE field may be used to indicate it is a merged message (i.e. one that is generated due to multiple triggering events). In this case, different ECODE values can simply indicate whether the program correlation message is a merged program correlation message or not, or may further indicate, if merged, what types of triggers caused the program correlation message to be generated.

By now it should be appreciated that there has been provided a data processing system having efficient real-time debug addressing. By generating address translation trace messages in response to modification or invalidation of an entry within address translation logic 205, debug circuitry 26 need not explicitly request this type of address translation information. In one embodiment, any modification of any of the one or more fields of the entry is sufficient to result in generation of an address translation trace message. In this manner, improved debugging may be performed in systems which utilize address translation, such as in systems which utilize one or more TLBs for translating addresses. Furthermore, in cases in which the virtual address mapping is changed, program correlation messages may be generated with the appropriate timing so as to provide more accurate information with respect to branch history information and sequence count information. Also, efficiency may be further improved by compressing one or more fields of the debug messages, by field-compressing the debug messages, or by merging multiple messages (such as program correlation messages) when possible. Changes to address translation mappings may be caused by processor instruction execution of control instructions for modification of TLB contents, or in alternate embodiments may be caused by memory management unit hardware which autonomously maintains the TLB via translation table searches such as by performing tablewalks to obtain new translations when TLB misses occur.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any number of integrated circuit chips may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system having a data processor for executing a plurality of data processing instructions; a memory coupled to the data processor for storing and providing information to the data processor; debug circuitry coupled to the data processor for generating debug messages including address translation trace messages; and a memory management unit coupled to the debug circuitry, data processor and the memory, the memory management unit comprising a translation lookaside buffer (TLB) for implementing address translation to translate addresses between virtual and physical forms. The debug circuitry includes message generation circuitry coupled to the memory management unit for receiving notice when TLB entries are modified and generating both an address translation trace message and a corresponding program correlation message containing at least one of branch history information and instruction count information. The branch history information includes a history of direct branch instructions that are executed and whether, when executed, the direct branch instructions were taken, and the instruction count information includes a count of one or more data processing instructions executed up to a point in time when a new TLB entry is established in the TLB. Item 2 includes the data processing system of item 1 wherein the message generation circuitry provides the corresponding program correlation message before providing the address translation trace message. Item 3 includes the data processing system of item 1 wherein the message generation circuitry detects a need to generate a second program correlation message at the same point in time due to an event other than modification of a TLB entry, and the message generation circuitry combines the program correlation message and the second program correlation message to form a merged program correlation message that contains the branch history information, the instruction count information and at least one field of merged information that is common to both the program correlation message and the second program correlation message. Item 4 includes the data processing system of item 1 wherein the message generation circuitry compresses a length of the address translation trace message and replaces a portion of the address translation trace message that is removed by compression with at least one of branch history information and instruction count information of one or more data processing instructions executed up to the point in time when the new TLB entry is established in the TLB. Item 5 includes the data processing system of item 1 wherein the corresponding program correlation message contains both branch history information and instruction count information. Item 6 includes the data processing system of item 1 wherein the message generation circuitry receives notice from the memory management unit in response to performing a TLB write entry operation. Item 7 includes the data processing system of item 1 wherein a debugger is coupled to the data processing system for receiving both the address translation trace message and the corresponding program correlation message from the debug circuitry, and the data processing system is within an integrated circuit and the debugger is external to the integrated circuit.

Item 8 includes a method which includes providing a data processor for executing a plurality of data processing instructions; coupling a memory to the data processor for storing and providing information to the data processor; coupling a memory management unit to the data processor and the memory, the memory management unit comprising a translation lookaside buffer (TLB) for implementing address translation to translate addresses between virtual and physical forms; and coupling debug circuitry to the data processor and memory management unit for generating debug messages including address translation trace messages. the debug circuitry receives notice when TLB entries are modified and generates both an address translation trace message and a corresponding program correlation message containing at least one of branch history information and instruction count information. The branch history information includes a history of direct branch instructions that are executed and whether, when executed, the direct branch instructions were taken, and the instruction count information includes a count of one or more data processing instructions executed up to a point in time when a new TLB entry is established in the TLB. Item 9 includes the method of item 8 and further includes providing the corresponding program correlation message before providing the address translation trace message. Item 10 includes the method of item 8 and further includes detecting a need to generate a second program correlation message at a same point in time as generating the program correlation message due to an event other than modification of a TLB entry; and combining the program correlation message and the second program correlation message to form a merged program correlation message that contains the branch history information, the instruction count information and at least one field of merged information that is common to both the program correlation message and the second program correlation message. Item 11 includes the method of item 8 and further includes compressing a length of the address translation trace message and replacing a portion of the address translation trace message that is removed by compression with at least one of branch history information and instruction count information of one or more data processing instructions executed up to the point in time when the new TLB entry is established in the TLB. Item 12 includes the method of item 8 and further includes forming the corresponding program correlation message contains both branch history information and instruction count information. Item 13 includes the method of item 8 and further includes the memory management unit providing notice to the debug circuitry in response to performing a TLB write entry operation.

Item 14 includes a data processing system having an instruction fetch unit for receiving and storing a plurality of data processing instructions; an instruction decoder coupled to the instruction fetch unit for receiving the plurality of data processing instructions and decoding each of the plurality of data processing instructions; an execution unit coupled to the instruction decoder for executing the plurality of data processing instructions; a memory coupled to the instruction fetch unit and the execution unit for storing information from the execution unit and providing information to the instruction fetch unit; debug circuitry coupled to the instruction fetch unit, where the instruction decoder and the execution unit generate debug messages including address translation trace messages; and a memory management unit coupled to the debug circuitry, data processor and the memory, wherein the memory management unit includes a translation lookaside buffer (TLB) for implementing address translation to translate addresses between virtual and physical forms. The debug circuitry includes message generation circuitry coupled to the memory management unit for receiving notice when TLB entries are modified and generating both an address translation trace message and a corresponding program correlation message containing at least one of branch history information and instruction count information. The branch history information includes a history of direct branch instructions that are executed and whether, when executed, the direct branch instructions were taken, and the instruction count information includes a count of one or more data processing instructions executed up to a point in time when a new TLB entry is established in the TLB. Item 15 includes the data processing system of item 14 wherein the message generation circuitry provides the corresponding program correlation message before providing the address translation trace message. Item 16 includes the data processing system of item 14 wherein the message generation circuitry detects a need to generate a second program correlation message at the same point in time due to an event other than modification of a TLB entry, and the message generation circuitry combines the program correlation message and the second program correlation message to form a merged program correlation message that contains the branch history information, the instruction count information and at least one field of merged information that is common to both the program correlation message and the second program correlation message. Item 17 includes the data processing system of item 14 wherein the message generation circuitry compresses a length of the address translation trace message and replaces a portion of the address translation trace message that is removed by compression with at least one of branch history information and instruction count information of one or more data processing instructions executed up to the point in time when the new TLB entry is established in the TLB. Item 18 includes the data processing system of item 14 wherein the corresponding program correlation message contains both branch history information and instruction count information. Item 19 includes the data processing system of item 14 wherein the message generation circuitry receives notice from the memory management unit in response to performing a TLB write entry operation. Item 20 includes the data processing system of item 14 wherein a debugger is coupled to the data processing system for receiving both the address translation trace message and the corresponding program correlation message from the debug circuitry, the data processing system being within an integrated circuit and the debugger being external to the integrated circuit.

What is claimed is:
1. A data processing system comprising:
a data processor for executing a plurality of data processing instructions;
a memory coupled to the data processor for storing and providing information to the data processor;
debug circuitry coupled to the data processor for generating debug messages including address translation trace messages;
a memory management unit coupled to the debug circuitry, data processor and the memory, the memory management unit comprising a translation lookaside buffer

(TLB) for implementing address translation to translate addresses between virtual and physical forms, wherein: the debug circuitry comprises:

message generation circuitry coupled to the memory management unit for receiving notice when TLB entries are modified and generating both an address translation trace message and a corresponding program correlation message containing at least one of branch history information and instruction count information, the branch history information comprising a history of direct branch instructions that are executed and whether, when executed, the direct branch instructions were taken, and the instruction count information being a count of one or more data processing instructions executed up to a point in time when a new TLB entry is established in the TLB.

2. The data processing system of claim 1 wherein the message generation circuitry provides the corresponding program correlation message before providing the address translation trace message.

3. The data processing system of claim 1 wherein the message generation circuitry detects a need to generate a second program correlation message at the same point in time due to an event other than modification of a TLB entry, and the message generation circuitry combines the program correlation message and the second program correlation message to form a merged program correlation message that contains the branch history information, the instruction count information and at least one field of merged information that is common to both the program correlation message and the second program correlation message.

4. The data processing system of claim 1 wherein the message generation circuitry compresses a length of the address translation trace message and replaces a portion of the address translation trace message that is removed by compression with at least one of branch history information and instruction count information of one or more data processing instructions executed up to the point in time when the new TLB entry is established in the TLB.

5. The data processing system of claim 1 wherein the corresponding program correlation message contains both branch history information and instruction count information.

6. The data processing system of claim 1 wherein the message generation circuitry receives notice from the memory management unit in response to performing a TLB write entry operation.

7. The data processing system of claim 1 wherein a debugger is coupled to the data processing system for receiving both the address translation trace message and the corresponding program correlation message from the debug circuitry, the data processing system being within an integrated circuit and the debugger being external to the integrated circuit.

8. A method comprising:
providing a data processor for executing a plurality of data processing instructions;
coupling a memory to the data processor for storing and providing information to the data processor;
coupling a memory management unit to the data processor and the memory, the memory management unit comprising a translation lookaside buffer (TLB) for implementing address translation to translate addresses between virtual and physical forms;
coupling debug circuitry to the data processor and memory management unit for generating debug messages including address translation trace messages, the debug circuitry receiving notice when TLB entries are modified and generating both an address translation trace message and a corresponding program correlation message containing at least one of branch history information and instruction count information, the branch history information comprising a history of direct branch instructions that are executed and whether, when executed, the direct branch instructions were taken, and the instruction count information being a count of one or more data processing instructions executed up to a point in time when a new TLB entry is established in the TLB.

9. The method of claim 8 further comprising:
providing the corresponding program correlation message before providing the address translation trace message.

10. The method of claim 8 further comprising:
detecting a need to generate a second program correlation message at a same point in time as generating the program correlation message due to an event other than modification of a TLB entry; and
combining the program correlation message and the second program correlation message to form a merged program correlation message that contains the branch history information, the instruction count information and at least one field of merged information that is common to both the program correlation message and the second program correlation message.

11. The method of claim 8 further comprising:
compressing a length of the address translation trace message and replacing a portion of the address translation trace message that is removed by compression with at least one of branch history information and instruction count information of one or more data processing instructions executed up to the point in time when the new TLB entry is established in the TLB.

12. The method of claim 8 further comprising:
forming the corresponding program correlation message contains both branch history information and instruction count information.

13. The method of claim 8 further comprising:
the memory management unit providing notice to the debug circuitry in response to performing a TLB write entry operation.

14. A data processing system comprising:
an instruction fetch unit for receiving and storing a plurality of data processing instructions;
an instruction decoder coupled to the instruction fetch unit for receiving the plurality of data processing instructions and decoding each of the plurality of data processing instructions;
an execution unit coupled to the instruction decoder for executing the plurality of data processing instructions;
a memory coupled to the instruction fetch unit and the execution unit for storing information from the execution unit and providing information to the instruction fetch unit;
debug circuitry coupled to the instruction fetch unit, the instruction decoder and the execution unit for generating debug messages including address translation trace messages;
a memory management unit coupled to the debug circuitry, data processor and the memory, the memory management unit comprising a translation lookaside buffer (TLB) for implementing address translation to translate addresses between virtual and physical forms, wherein: the debug circuitry comprises:
message generation circuitry coupled to the memory management unit for receiving notice when TLB entries are modified and generating both an address translation trace message and a corresponding program correlation message containing at least one of branch history information and instruction count information, the branch history information comprising a history of direct branch instructions that are executed and whether, when executed, the direct branch instructions were taken, and the instruction count information being a count of one or more data processing instructions executed up to a point in time when a new TLB entry is established in the TLB.

15. The data processing system of claim 14 wherein the message generation circuitry provides the corresponding program correlation message before providing the address translation trace message.

16. The data processing system of claim 14 wherein the message generation circuitry detects a need to generate a second program correlation message at the same point in time due to an event other than modification of a TLB entry, and the message generation circuitry combines the program correlation message and the second program correlation message to form a merged program correlation message that contains the branch history information, the instruction count information and at least one field of merged information that is common to both the program correlation message and the second program correlation message.

17. The data processing system of claim 14 wherein the message generation circuitry compresses a length of the address translation trace message and replaces a portion of the address translation trace message that is removed by compression with at least one of branch history information and instruction count information of one or more data processing instructions executed up to the point in time when the new TLB entry is established in the TLB.

18. The data processing system of claim 14 wherein the corresponding program correlation message contains both branch history information and instruction count information.

19. The data processing system of claim 14 wherein the message generation circuitry receives notice from the memory management unit in response to performing a TLB write entry operation.

20. The data processing system of claim 14 wherein a debugger is coupled to the data processing system for receiving both the address translation trace message and the corresponding program correlation message from the debug circuitry, the data processing system being within an integrated circuit and the debugger being external to the integrated circuit.

* * * * *